United States Patent
Kawano

(10) Patent No.: US 11,809,755 B2
(45) Date of Patent: Nov. 7, 2023

(54) PRINT SYSTEM AND METHOD FOR A PRINT JOB GENERATED BY A USER TERMINAL TO BE EXECUTED BY ONE OF SEVERAL IMAGE FORMING APPARATUSES

(71) Applicant: SHARP KABUSHIKI KAISHA, Sakai (JP)

(72) Inventor: Shinichi Kawano, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/741,757

(22) Filed: May 11, 2022

(65) Prior Publication Data

US 2022/0413774 A1    Dec. 29, 2022

(30) Foreign Application Priority Data

Jun. 25, 2021  (JP) .................. 2021-105285

(51) Int. Cl.
*G06F 3/12*    (2006.01)

(52) U.S. Cl.
CPC ............ *G06F 3/1203* (2013.01); *G06F 3/126* (2013.01); *G06F 3/1222* (2013.01); *G06F 3/1238* (2013.01); *G06F 3/1267* (2013.01); *G06F 3/1293* (2013.01)

(58) Field of Classification Search
None
See application file for complete search history.

(56) References Cited

U.S. PATENT DOCUMENTS

| | | | |
|---|---|---|---|
| 2016/0070509 A1* | 3/2016 | Takahira | G06F 3/1292 358/1.15 |
| 2017/0070640 A1* | 3/2017 | Kondoh | H04N 1/00344 |
| 2017/0075635 A1* | 3/2017 | Maemura | G06F 3/1285 |
| 2020/0364006 A1* | 11/2020 | Otsuka | G06F 3/1285 |
| 2021/0105375 A1* | 4/2021 | Hayashi | H04N 1/4413 |
| 2022/0283764 A1* | 9/2022 | Kato | G06F 3/1259 |
| 2022/0300216 A1* | 9/2022 | Yoshimoto | G06F 3/1236 |
| 2022/0311879 A1* | 9/2022 | Renes | H04N 1/00244 |

FOREIGN PATENT DOCUMENTS

JP    2008-207456 A    9/2008

* cited by examiner

*Primary Examiner* — Henok Shiferaw
(74) *Attorney, Agent, or Firm* — ScienBiziP, P.C.

(57) ABSTRACT

In a print system, a user terminal generates a print job including identification information of an apparatus user of an image-forming apparatus designated by a terminal user and transmits the print job to an information processing apparatus (print server). The apparatus user of the image-forming apparatus requests a list of print jobs including identification information of the apparatus user to the information processing apparatus. When receiving target print job data from the information processing apparatus together with the print job list, the image-forming apparatus executes the print job in accordance with an operation of the apparatus user specified by the terminal user.

5 Claims, 14 Drawing Sheets

FIG. 6

PRINT JOB DATA

| DELIMITER | IDENTIFICATION INFORMATION (USER INFORMATION) | DELIMITER | FILE NAME | IDENTIFIER |
|---|---|---|---|---|
| @ | S1100001 | @ | QUOTATION | .xlsx |
| @! | S1100003 | @! | CATALOG | .pdf |
| | | | | |

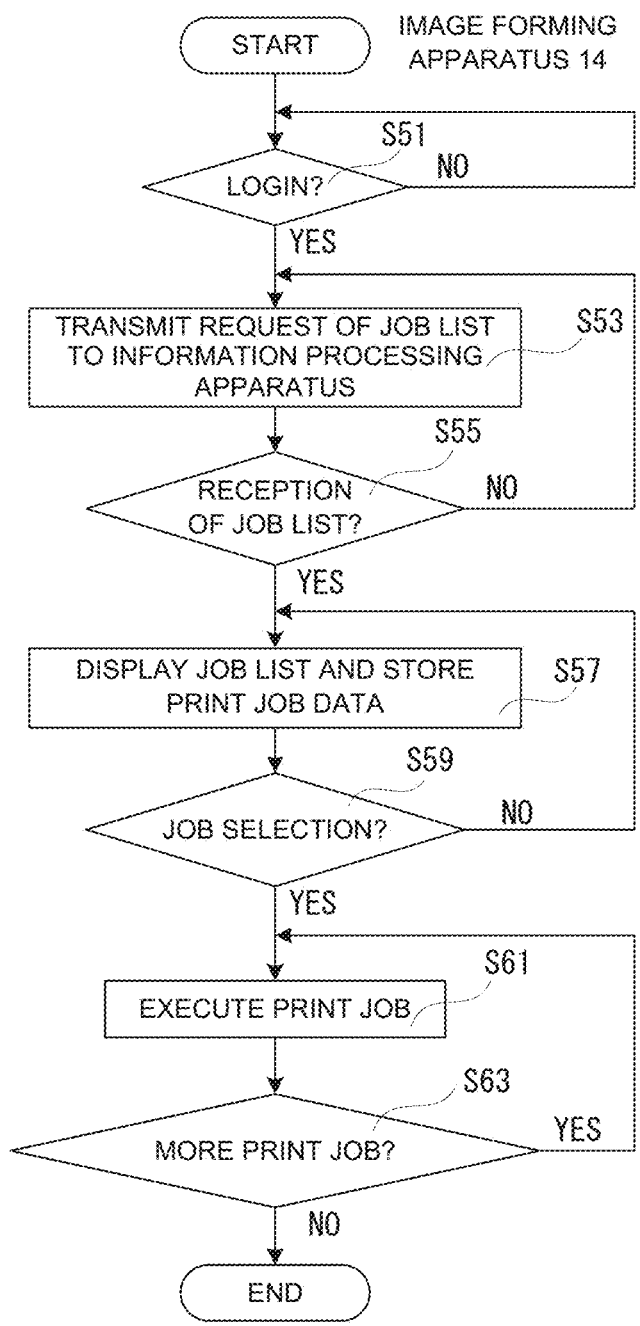

PRINT SYSTEM AND METHOD FOR A PRINT JOB GENERATED BY A USER TERMINAL TO BE EXECUTED BY ONE OF SEVERAL IMAGE FORMING APPARATUSES

BACKGROUND OF THE INVENTION

Field of the Invention

The present disclosure relates to a print processing system and a print method, in particular, for example, to a print system that includes a plurality of image-forming apparatuses and that can cause a desired one of the image-forming apparatuses to perform a process of printing a print job generated by a user terminal and a print method.

Description of the Background Art

As an example of this type of background art, the following technology is known. A printing-permitted user associated with a keyword included in a file name is set, and when it is determined that a user associated with the keyword included in the file name for authentication printing is a user who executes printing, the user is allowed to print the file by entering a password. Therefore, a user other than a user who sent a print job to an image-forming apparatus (multifunction peripheral) may perform the authentication printing.

However, the association between the keyword and the printing-permitted user is required to be set in advance in the image-forming apparatus, and only a predetermined image-forming apparatus could perform printing.

Therefore, a main object of the present disclosure is to provide a novel print system and a novel print method.

Another object of the present disclosure is to provide a print system and a print method that can improve convenience when proxy printing is performed on a print job.

SUMMARY OF THE INVENTION

In order to solve the above problem, the present disclosure has adopted the following structure. Note that reference signs and supplementary explanations in parentheses and the like indicate correspondence with embodiments described to help understanding of the present disclosure and do not limit the present disclosure in any way.

According to a first aspect of the present disclosure, in a print system in which a print job generated by a user terminal is executed by an image-forming apparatus through an information processing apparatus, the user terminal includes a transmitter that transmits a print job including identification information specifying an apparatus user of the image-forming apparatus to the information processing apparatus, the information processing apparatus includes a storage that stores a print job transmitted from the user terminal, and a transmitter that transmits a job list of print jobs including the identification information to the image-forming apparatus when the image-forming apparatus issues a request, and the image-forming apparatus includes a receiver that receives a print job included in the job list from the information processing apparatus, and an executer that executes the received print job.

According to the first aspect, the print system (10: the reference numeral to demonstrate the corresponding portion in the embodiment; the same applies hereinafter) includes a user terminal (12), an image-forming apparatus (14), and an information processing apparatus (16). a print job generated by the user terminal (12) is executed by the image-forming apparatus (14) via the information processing apparatus (16). The user terminal (12) includes a transmitter (20, 22, S17) that transmits a print job including identification information indicating an apparatus user of the image-forming apparatus to the information processing apparatus (14). The information processing apparatus (16) stores the print job transmitted from the user terminal (12) in the storage (76). Then, the transmitter (64, 66, S39) transmits a job list including the print job having the identification information to the image-forming apparatus (14) when the image-forming apparatus issues a request. The image-forming apparatus (14) includes a receiver (46, 42, S57) that receives a print job included in a job list (112) from the information processing apparatus, and an executer (38, S61) that executes the received print job.

According to the first aspect, since a print job includes identification information that specifies an apparatus user of an image-forming apparatus, the apparatus user may execute the print job using an arbitrary image-forming apparatus, and therefore, convenience at a time of proxy printing of the print job performed by the image-forming apparatus may be improved.

According to a second aspect of the present disclosure that belongs to the first aspect, the user terminal in the print system includes a first determiner that determines whether the apparatus user having the identification information included in the print job is registered in the target image-forming apparatus, and a canceller that cancels the print job when the first determiner determines that the apparatus user is not registered in the target image-forming apparatus.

According to a second aspect of the present disclosure, the first determiner (20, S5) in the user terminal (12) determines whether the apparatus user having the identification information included in the print job is registered in the target image-forming apparatus, and the canceller (20, S7) cancels the print job when the first determiner determines that the apparatus user is not registered in the target image-forming apparatus.

According to the second aspect of the present disclosure, since a print job that does not include identification information specifying the apparatus user of the image-forming apparatus is canceled, the print job is reliably transmitted to the target image-forming apparatus.

According to a third aspect of the present disclosure, a print method is employed in a print system in which a print job generated by a user terminal is executed by an image-forming apparatus through an information processing apparatus. The user terminal transmits a print job including identification information specifying an apparatus user of the image-forming apparatus to the information processing apparatus. The information processing apparatus stores a print job transmitted from the user terminal. The image-forming apparatus requests the information processing apparatus to transmit a job list of print jobs including the identification information. The image-forming apparatus receives a print job included in the job list from the information processing apparatus. The image-forming apparatus executes the received print job.

According to a third aspect of the present disclosure, the same advantage as that of the first aspect can be expected.

According to the present disclosure, a registered user who is requested to perform proxy printing of a print job can perform printing using an arbitrary image-forming apparatus, and therefore, convenience of proxy printing on a print job can be improved.

The aforementioned objects and other objects, features, and advantages of the present disclosure will be more apparent from the detailed description of the embodiment given below with reference to the drawings.

BRIEF DESCRIPTION OF THE DRAWINGS

FIG. 6 is an illustrative view of an example of print job data.

FIG. 14 is a flowchart of a portion of an example of an operation of the image-forming apparatus according to the embodiment illustrated in FIG. 1.

DESCRIPTION OF THE PREFERRED EMBODIMENTS

Figure 1:
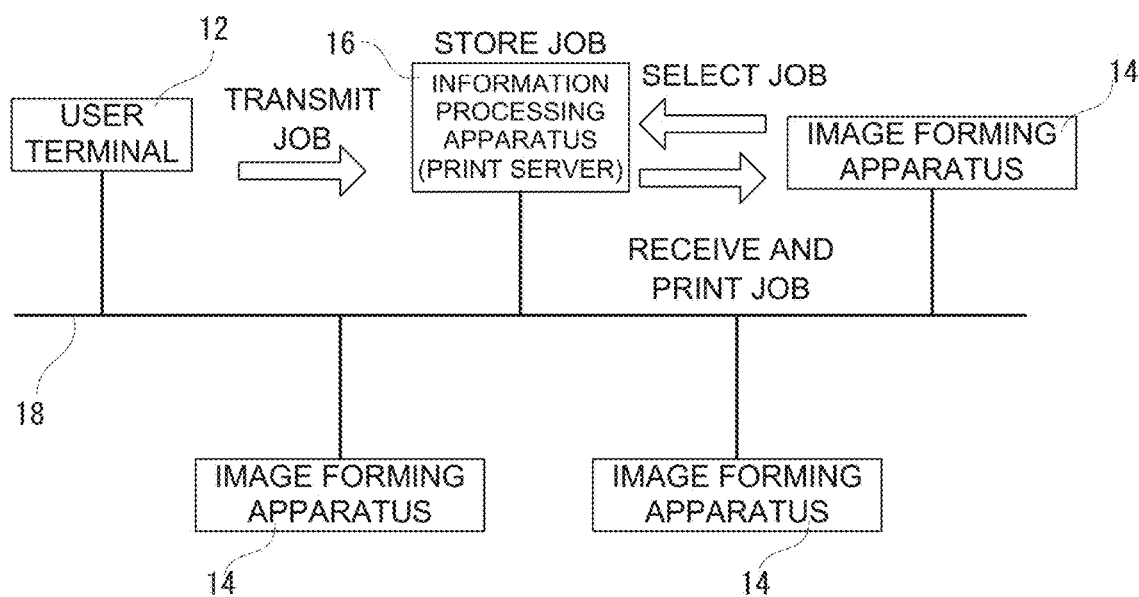
FIG. 1 is a block diagram illustrating an image-forming system of an embodiment of the present disclosure.

FIG. 1 is a block diagram illustrating a print system 10 of an embodiment of the present disclosure. Referring to FIG. 1, the print system 10 of this embodiment includes a user terminal 12, a plurality of image-forming apparatuses 14 and an information processing apparatus (print server) 16. Each of the image-forming apparatuses 14 is connected to the user terminal 12, the other image-forming apparatuses 14, and the information processing apparatus 16 via a network 18, such as the Internet or a LAN, in a communication available manner.

Although FIG. 1 shows a case in which one information processing apparatus 16 is connected to the network 18, two or more information processing apparatuses 16 may be used.

Figure 2:
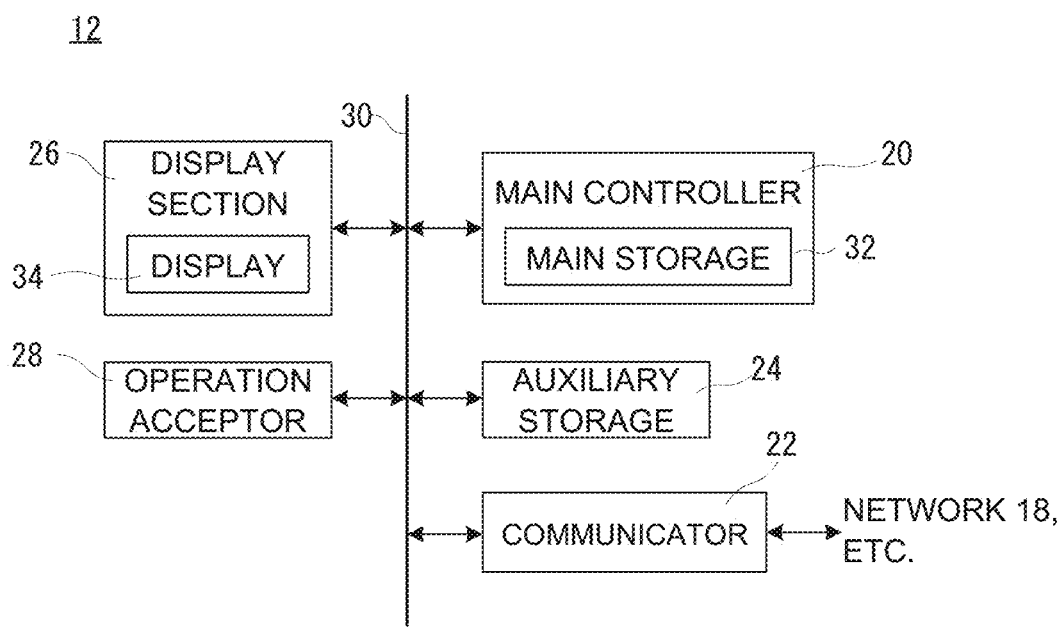
FIG. 2 is a block diagram illustrating an electric configuration of a user terminal in the embodiment illustrated in FIG. 1.

The user terminal 12 in the embodiment illustrated in FIG. 1 includes, as illustrated in FIG. 2, a main controller 20, a communicator 22, and an auxiliary storage 24. The user terminal 12 further includes a display section 26 and an operation acceptor 28. These are connected to one another via a common bus 30.

The main controller 20 that is a control section included in the user terminal 12 controls the entire user terminal 12. Therefore, the main controller 20 includes a CPU (central processing unit), a processor, or a computer. Furthermore, the main controller 20 also includes a main storage 32 as a main storage section in the user terminal 12. This main storage 32 includes a RAM (random access memory) and a ROM (read-only memory), for example.

The communicator 22 that is a communication section included in the user terminal 12 can execute a bi-directional communication process via the network 18 (FIG. 1).

The auxiliary storage 24 that is an auxiliary storage section included in the user terminal 12 includes, for example, a hard disk and a flash memory.

The display section 26 includes a display 34 as a display portion. The display 34 is a liquid crystal display (LCD), for example, but not limited to this and may be an organic EL (electroluminescence) display or the like.

The operation acceptor 28 functions as an operation reception section, has a touch panel (not shown) that cooperates with the display 34, as an example, and may further include an appropriate hardware switch, such as a push button switch.

Figure 3:
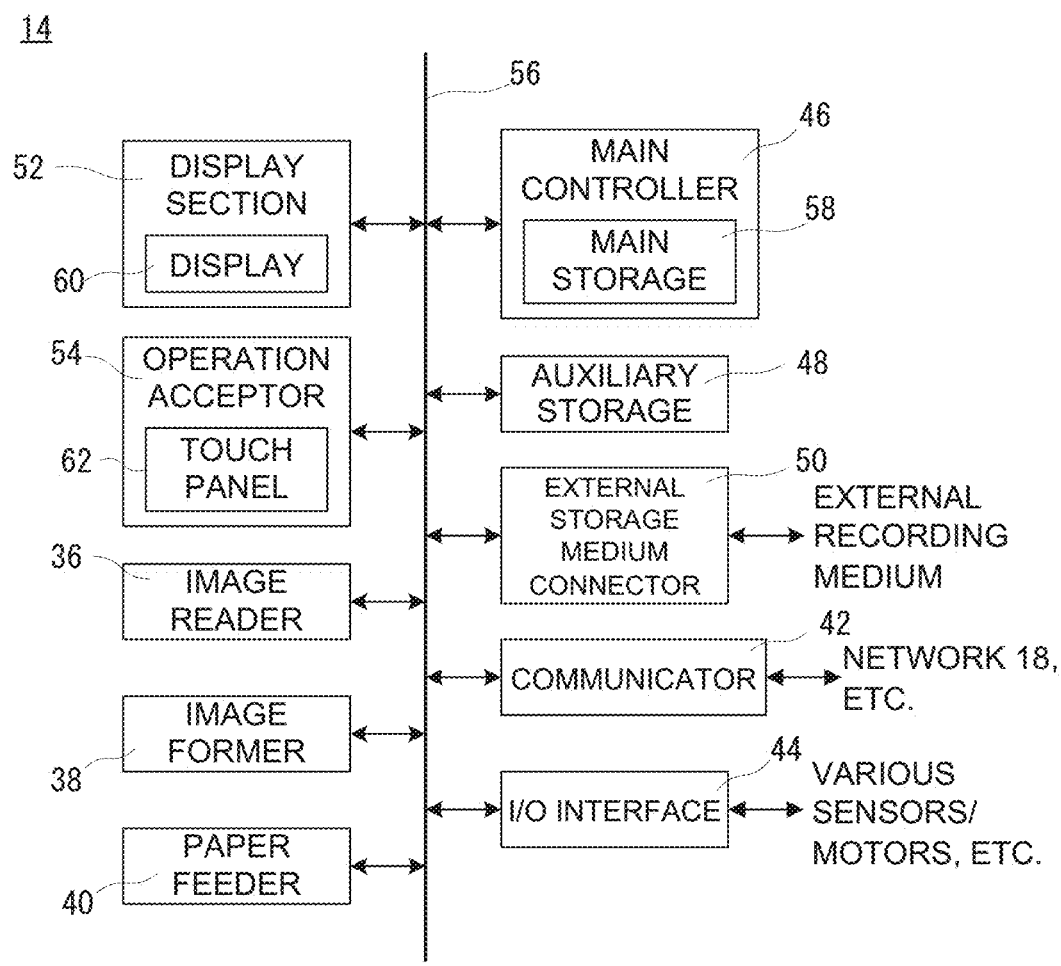
FIG. 3 is a block diagram illustrating an electric configuration of an image-forming apparatus (multifunction peripheral) according to the embodiment illustrated in FIG. 1.

Each of the image-forming apparatuses 14 according to the embodiment illustrated in FIG. 1 is a multifunction peripheral, and FIG. 3 is a block diagram illustrating an example of an electric configuration of the image-forming apparatuses 14. Each of the image-forming apparatuses 14 includes an image reader 36, an image former 38, and a paper feeder 40. Each of the image-forming apparatuses 14 further includes a communicator 42 and an input/output interface (I/O) 44. Each of the image-forming apparatuses 14 further includes a main controller 46, an auxiliary storage 48, and an external storage medium connector 50. Each of the image-forming apparatuses 14 further includes a display section 52 and an operation acceptor 54. These are connected to one another via a common bus 56.

As is well known, the image reader 36 is an image reading section that reads an image of a document and outputs two-dimensional image data corresponding to the image of the document. Therefore, the image reader 36 includes a document mounting table, a light source, a plurality of mirrors, an image forming lens, a line sensor, and the like, all of which are not shown.

The image former 38 is an image-forming section that forms an image on a recording sheet by an electrophotographic method. Therefore, the image former 38 includes a photosensitive drum, a charging device, an exposure device, a developing device, a transfer device, and a fixing device, all of which are not shown. Image data output from the image reader 36, for example, is used in an image forming process performed by the image former 38. In addition, image data based on various files obtained from an external storage medium described below and the like may also be used in the image forming process performed by the image former 38. Note that the image former 38 can execute not only a black-and-white image forming process but also a color image forming process.

The paper feeder 40 includes a paper feeding cassette (not shown) and is a paper feeding section that feeds recording sheets stored in the paper feeding cassette one by one into the image former 38.

The communicator 42 is a communication section that can perform a bi-directional communication process via the network 18. Moreover, the communicator 42 can also perform communication using wireless methods, such as the Wi-Fi (registered trademark) method.

The input/output interface 44 is connected to the various sensors and motors or strictly speaking, is connected to drive circuits thereof. Examples of the various sensors include a sensor for detecting a sheet in the paper feeding cassette, a toner sensor in the developing device, and a paper detection sensor provided as appropriate in a paper transport path from the paper feeding cassette to a paper discharger. Furthermore, examples of the motor include a motor for paper transport, which is provided as appropriate in the paper transport path, and a motor for driving the photosensitive drum described above. Through the input/output interface 44, output signals are sent from the respective sensors to the main controller 46, and control signals are sent from the main controller 46 to the individual motors.

The main controller 46 is a control section that controls the entire image-forming apparatus 14. Therefore, the main controller 46 includes a CPU, a processor, or computer and includes a main storage 58 as a main storage section that can be directly accessed by the CPU, the processor, or the computer. The main storage 58 includes a RAM and a ROM, for example.

The auxiliary storage 48 is an auxiliary storage section including, for example, a hard disk and a flash memory. The auxiliary storage 48 stores various types of image data, such as image data output from the image reader 36, and various types of data other than the image data as appropriate under control of the CPU, the processor, or the computer of the main controller 46.

The external storage medium connector 50 has a connection port through which an external storage medium, such as a USB memory, can be connected and transmits/receives data, such as various files, to/from the external storage medium. Therefore, data recorded in the external storage medium, such as various files, may be obtained by the image-forming apparatus 14 or data, such as various files, may be supplied from the image-forming apparatus 14 to the external storage medium that stores the data, for example.

The display section 52 has a display 60 as a display section. The display 60 works together with a touch panel 62 included in the operation acceptor 54 so as to constitute a display with touch panel (touch screen). The display 60 is a liquid crystal display (LCD), for example, but is not limited to this and may be an organic EL display or the like. Moreover, the display section 52 may include, in addition to the display 60, an appropriate light emitting element, such as a light emitting diode.

The operation acceptor 54 has the touch panel 62 serving as an operation receiving section. The touch panel 62 works together with the display 60 so as to constitute a display with a touch panel as described above. Therefore, the touch panel 62 is provided so as to be superposed on a display surface of the display 60, for example. Moreover, the operation acceptor 54 may include an appropriate hardware switch, such as a push button switch, in addition to the touch panel 62.

Figure 4:
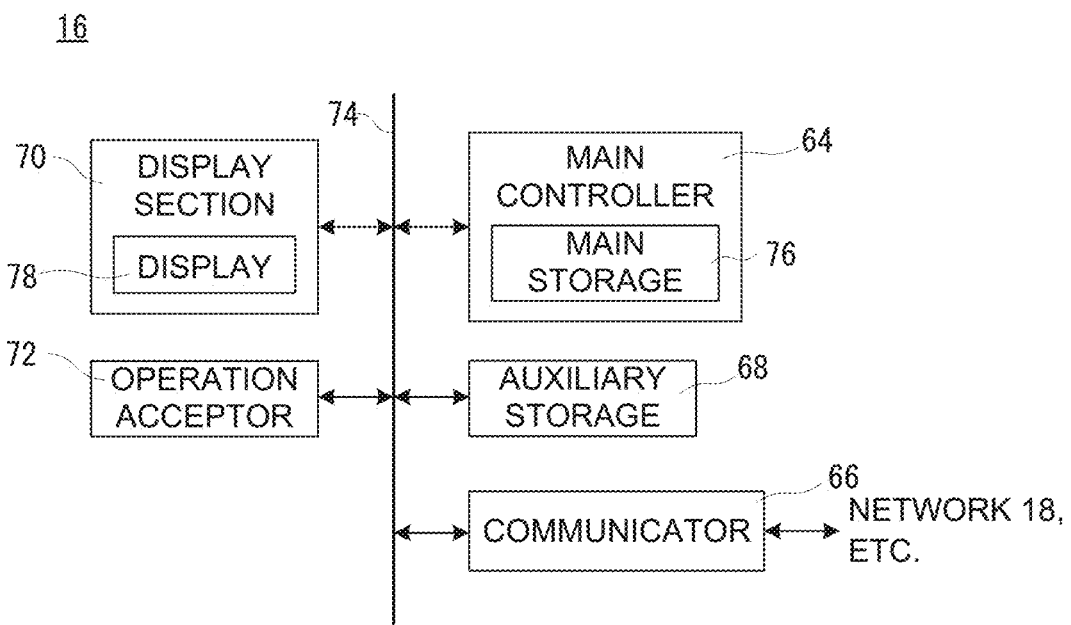
FIG. 4 is a block diagram illustrating an electric configuration of a print server (information processing apparatus) according to the embodiment illustrated in FIG. 1.

The information processing apparatus (print server) 16 in the embodiment illustrated in FIG. 1 includes a main controller 64, a communicator 66, and an auxiliary storage 68 as shown in FIG. 4. The information processing apparatus 16 further includes a display section 70 and an operation acceptor 72. These are connected to one another via a common bus 74.

The main controller 64 is a control section included in the information processing apparatus 16 and controls the entire information processing apparatus 16. Therefore, the main controller 64 includes a CPU, a processor, or a computer. The main controller 64 further includes a main storage 76 as a main storage section in the information processing apparatus 16. This main storage 76 include a RAM and a ROM, for example.

The communicator 66 is a communication section in the information processing apparatus 16 that can perform a bi-directional communication process via the network 18.

The auxiliary storage 68 is an auxiliary storage section in the information processing apparatus 16 includes, for example, a hard disk and a flash memory.

The display section 70 includes a display 78 as a display unit. The display 78 is a liquid crystal display (LCD), for example, but is not limited to this and may be an organic EL display or the like.

The operation acceptor 72 functions as an operation reception section, and may have, as an example, a touch panel (not shown) that cooperates with the display 78.

Briefly, in the print system 10 according to the embodiment illustrated in FIG. 1, a user of the user terminal 12 (hereinafter referred to as a "terminal user" where appropriate) generates a print job (print document file) using the user terminal 12. The print job includes identification information of a user using a corresponding one of the image-forming apparatuses 14 desired by the terminal user (hereinafter referred to as an "apparatus user" where appropriate).

The print job is then sent from the user terminal 12 to the information processing apparatus (print server) 16. The information processing apparatus 16 stores the print job received from the user terminal 12.

After logging in to the image-forming apparatus 14, the apparatus user uses an operation screen (described below) to request a list of print jobs (print job list) including the identification information of the apparatus use, that is stored in the information processing apparatus 16, to the information processing apparatus 16.

When target print job data is received from the information processing apparatus 16 along with the print job list, the print job list is displayed in the display section 52 of the image-forming apparatus 14 and the print job data is stored in the main storage 58.

The apparatus user selects one or more print jobs from the displayed print job list by a touch operation, for example. When a print job is selected, the selected print job is read from the main storage 58, and thus the image-forming apparatus 14 executes (prints) the print job in response to an operation performed by the apparatus user specified by the terminal user.

Figure 5:
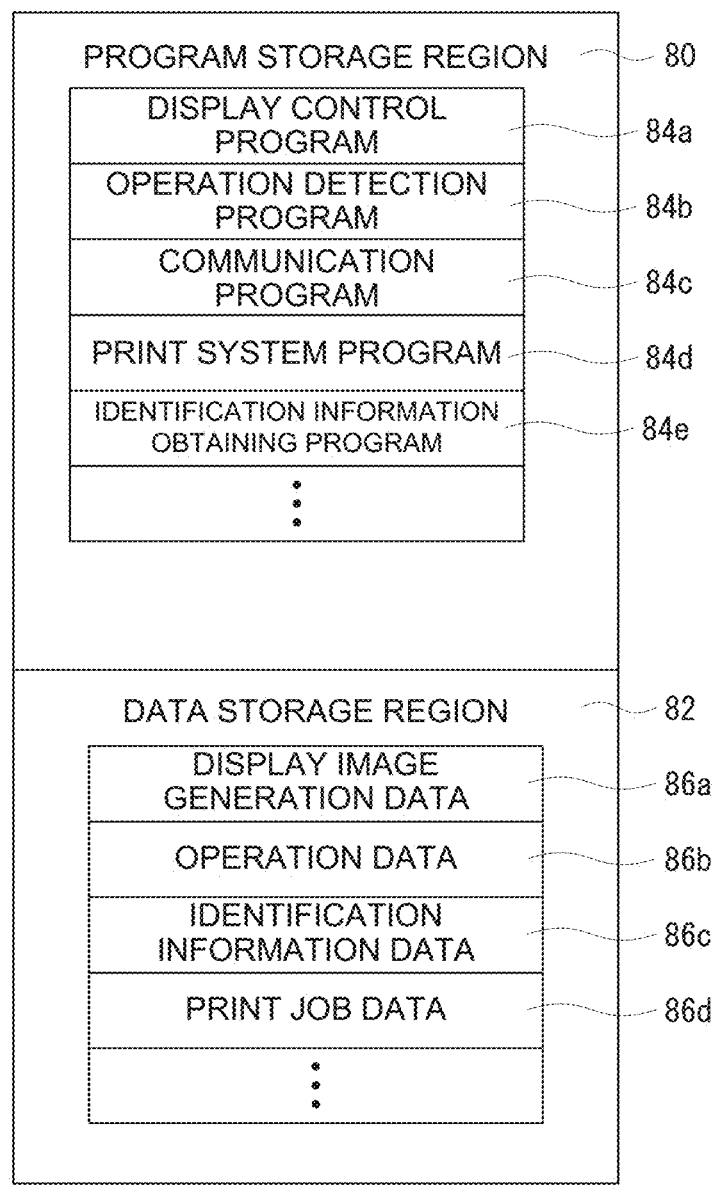
FIG. 5 is an illustrative view of an example of a memory map of a RAM in a user terminal according to the embodiment illustrated in FIG. 1.

FIG. 5 is an illustrative view of an example of a memory map of the main storage (RAM) 32 of the user terminal 12 according to the embodiment illustrated in FIG. 1.

As illustrated in FIG. 5, the main storage 32 includes a program storage region 80 and a data storage region 82. The program storage region 80 stores control programs of the user terminal 12.

The control programs of the user terminal 12 include a display control program 84*a*, an operation detection program 84*b*, a communication program 84*c*, a print system program 84*d*, and an identification information obtaining program 84*e*.

The display control program 84*a* is used to generate display screen data required for displaying various screens on a screen of the display 34 based on display image generation data 86*a* described below or the like, and causes the display section 26 to display an image on the display 34 using the display screen data.

The operation detection program 84b is used to detect operation data (described below) 86b corresponding to an operation performed by the user terminal 12 on the operation acceptor 28. For example, when the touch panel (not illustrated) is touched, the main controller (computer) 20 obtains coordinate data output from the touch panel as the operation data 86b in accordance with the operation detection program 84b and stores the operation data 86b in the data storage region 82 of the main storage 32. Furthermore, when a hardware button or a key (not illustrated) included in the user terminal 12 is pressed or operated, the main controller 20 obtains operation data 86b of pressing or operating of a button or the key in accordance with the operation detection program 84b, and stores the operation data 86b in the data storage region 82 of the main storage 32.

The communication program 84c is used to control the communicator 22 and communicate through the network 18 (FIG. 1) to the image-forming apparatuses 14, the information processing apparatus (print server) 16, and the like.

The print system program 84d that is an application program used for requesting one of the image-forming apparatuses 14 to preform proxy printing in the embodiment illustrated in FIG. 1 generates a print job in which various print conditions (parameters) are set and transmits the print job to the information processing apparatus 16.

The identification information obtaining program 84e is used to obtain identification information, such as a user ID, of the apparatus user who is registered as available in the image-forming apparatus 14, that is required when the user terminal 12 requests the proxy printing to one of the image-forming apparatuses 14. Specifically, transmission of the identification information is requested to the information processing apparatus 16, the identification information is received (obtained) from the information processing apparatus 16, and the obtained identification information is stored in the data storage region 82 as identification information data 86c described below.

Although not illustrated, other programs and the like required for controlling the user terminal 12 are also stored in the program storage region 80.

The data storage region 82 stores display image generation data 86a, operation data 86b, identification information 86c, print job data 86d, and the like.

The display image generation data 86a includes polygon data, texture data, etc., for generating a display image. Furthermore, the display image generation data 86a includes image data corresponding to a software key and image generation data for displaying various screens described below.

The operation data 86b is detected in accordance with the operation detection program 84b and is stored in time series. Note that the operation data 86b is deleted after being used in processing performed by the main controller 20.

Identification information data 86c is identification information of the apparatus user registered as available in the image-forming apparatus 14 obtained from the information processing apparatus 16 as described above.

As shown in FIG. 6, for example, the print job data 86d includes the identification information described above sandwiched between delimiters (e.g., "@" or "@!") (an ID of the apparatus user registered in the image-forming apparatus 14) and a file name and an identifier of a document (file) or the like that is requested to be printed.

Note that, although not illustrated, the data storage region 82 not only stores other data required for execution of the control programs of the user terminal 12 but also includes a flag and a counter (timer) required for executing the control programs.

Figure 7:
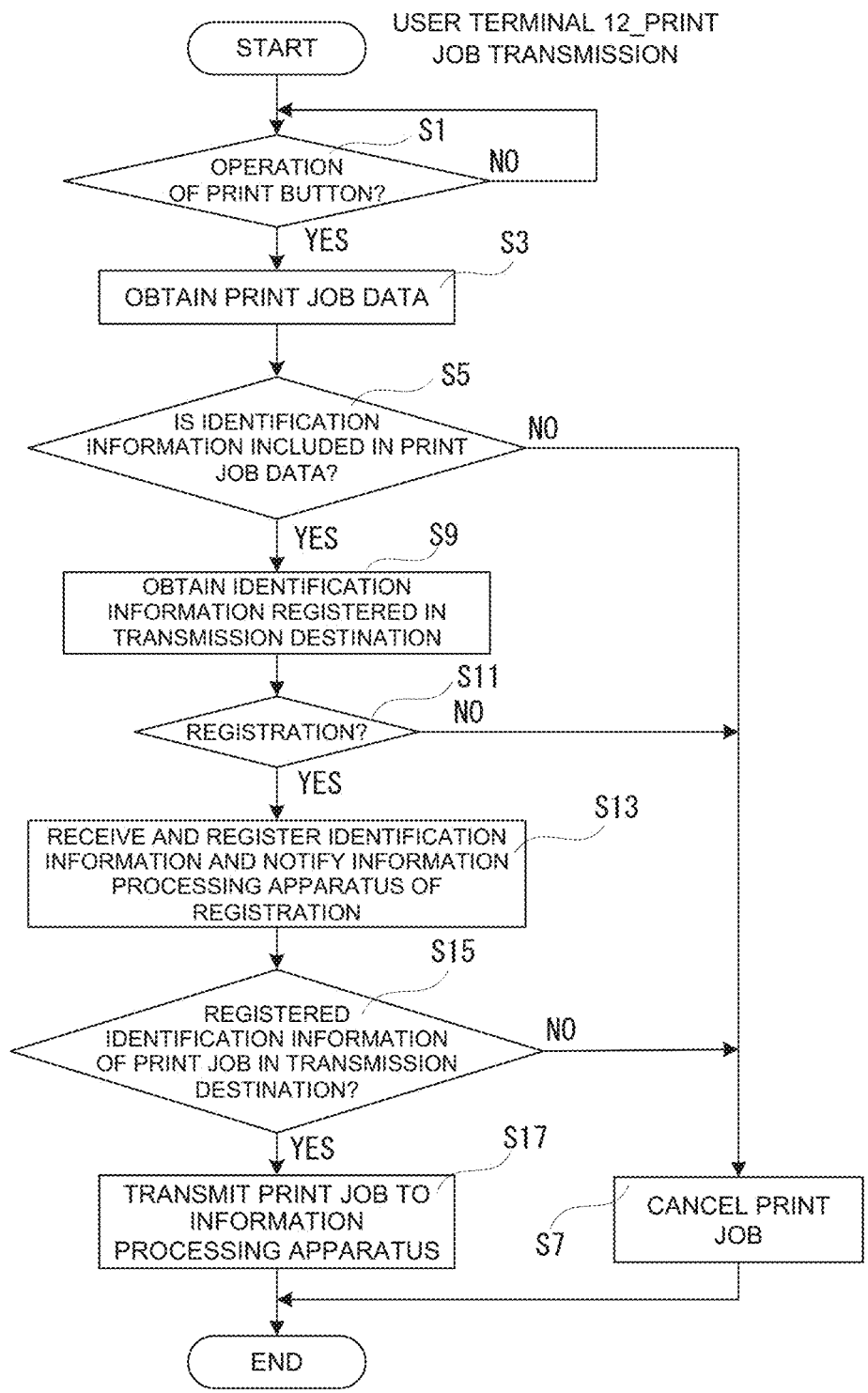
FIG. 7 is a flowchart of an example of an operation of the user terminal according to the embodiment illustrated in FIG. 1.
Figure 8:
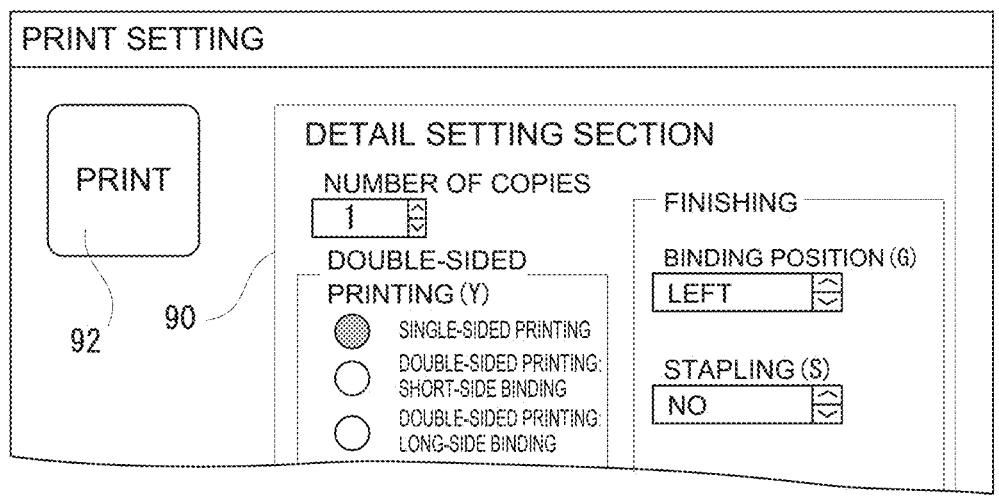
FIG. 8 is an illustrative view of an example of a print setting screen of the user terminal according to the embodiment illustrated in FIG. 1.

Referring to FIG. 7, in first step S1, the main controller 20 of the user terminal 12 determines whether the user has operated a print button 92 on the print setting screen 88 illustrated in FIG. 8.

Here, the print setting screen 88 will be briefly described. The print setting screen 88 is a GUI screen displayed on the display 34 (FIG. 2) in accordance with the print system program 84d illustrated in FIG. 5 and displays a detail setting section 90, a print button 92, and the like. In the detail setting section 90, items (printing parameters) that can be set during normal printing, such as the number of copies to be printed and whether to print double-sided (or single-sided), can be set, as well as a finishing method and the like. The print button 92 is operated when the setting of the print parameters is terminated in the detail setting section 90, at which time print job data as shown in FIG. 6 is generated, and the print job data is stored as the print job data 86d illustrated in FIG. 5 in the data storage region 82 of the main storage 32.

When the determination is affirmative in step S1, the main controller 20 obtains print job data in step S3. The print job data here refers to the print job data shown in FIG. 6 described above.

Subsequently, in step S5, the main controller 20 determines whether the obtained print job data includes identification information of an apparatus user.

When the determination is negative in step S5, the main controller 20 deletes the registered print job data 86d in step S7 so as to cancel the print job and terminate the process.

When the determination is affirmative in step S5, that is, when it is determined that the print job data includes identification information of an apparatus user, the main controller 20 obtains identification information of apparatus users registered as users of one of the image-forming apparatuses 14 of a transmission destination in next step S9. Specifically, in step S9, the main controller 20 requests the information processing apparatus 16 to transmit a list of identification information of apparatus users.

Figure 9:
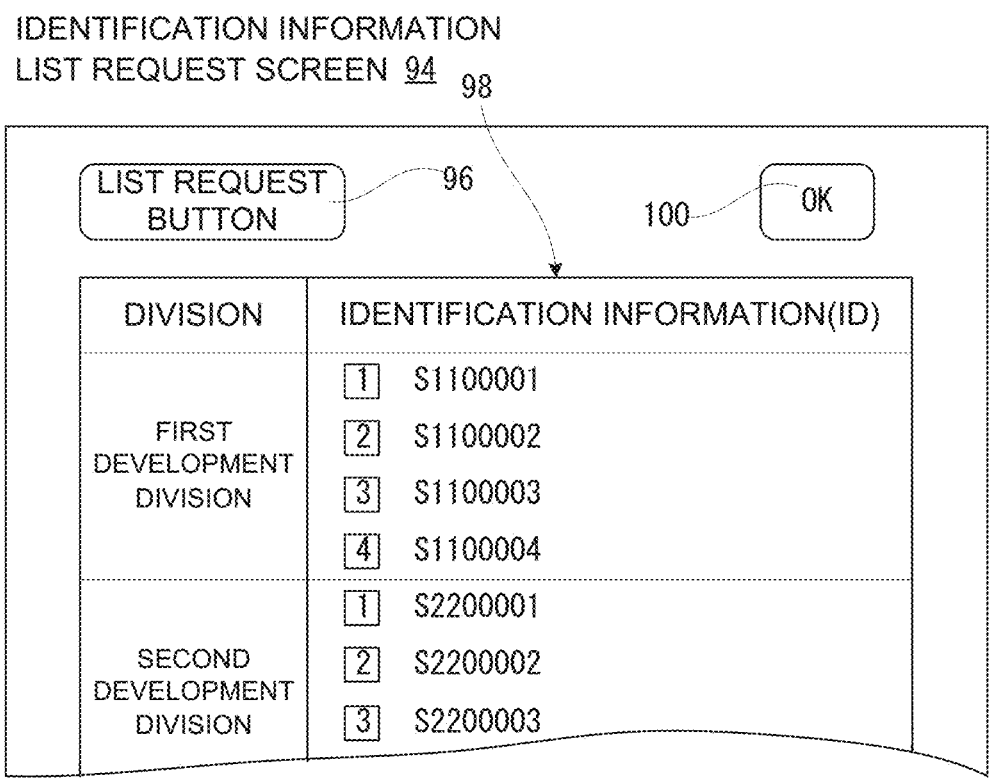
FIG. 9 is an illustrative view of an example of an identification information list request screen of the user terminal according to the embodiment illustrated in FIG. 1.

In step S9, the main controller 20 controls the display section 26 in accordance with the print system program 84d so as to display an identification information list request screen 94 illustrated in FIG. 9 on the display 34. The identification information list request screen 94 includes a list request button 96, and when the user operates the list request button 96, the main controller 20 sends a list request to the information processing apparatus 16 via the network 18. The information processing apparatus 16 centrally controls the apparatus users of all the image-forming apparatuses 14 included in the print system 10, and therefore, when receiving the request for transmitting the identification information list from the user terminal 12, transmits an identification information list 98 illustrated in FIG. 9 to the user terminal 12 through the network 18. Specifically, the information processing apparatus 16 generates data on the identification information list by collecting the identification information of the apparatus users who have executed print jobs from print job logs of the individual image-forming apparatuses 14.

Note that an OK button 100 provided on the identification information list request screen 94 is operated when the identification information list 98 is received from the information processing apparatus 16, and in this way, a notification of a reception of the identification information list may be transmitted to the information processing apparatus 16.

In the example shown in FIG. 9, as shown in the identification information list 98, image-forming apparatuses are installed in various divisions and a plurality of users are registered in each of the image-forming apparatuses.

Such an identification information list 98 is obtained in step S9. Therefore, the main controller 20 can determine whether the identification information included in the print job data shown in FIG. 6 is included in the identification information list 98. For example, since identification information "S1100001" is included in first print job data in the print job data illustrated in FIG. 6 and the identification information is also included in the identification information list 98 in FIG. 9, it is apparent that an apparatus user of one of the image-forming apparatuses 14 specified by the terminal user of the user terminal 12 included in a print job has already been registered.

When the identification information included in the print job data is not included in the identification information list 98, the apparatus user of the image-forming apparatus specified by the terminal user of the user terminal 12 is a new user.

In this case, in step S11, the main controller 20 controls the display section 26 (FIG. 2) in accordance with the print system program 84*d* so as to display a GUI (not illustrated) for confirming whether the new apparatus user is to be registered for the terminal user of the user terminal 12 in the display 34.

When the terminal user inputs the registration of the new user in response to the GUI, the determination is affirmative in step S11. When the user input indicates "YES", the identification information is stored in step S13 as the identification information data 86*c* in the data storage region 82 of the main storage 32. In addition, in step S13 or in another suitable step, the identification information of the new apparatus user is sent via the network 18 to the information processing apparatus 16. In the information processing apparatus 16, the identification information of the apparatus user of the image-forming apparatus 14 registered in the user terminal 12, which is not shown in the figure, is registered as identification information data 108*c* (described below) in the main storage 76 (FIG. 4).

Subsequently, in step S15, the main controller 20 determines whether the identification information has been registered in the print job (FIG. 6) to be transmitted as a user of the image-forming apparatus 14 of a transmission destination with reference to the identification information data 86*c* of FIG. 5. When the determination is negative in step S15, the print job is deleted in step S7 and the process is terminated.

When the determination is affirmative in step S15, the main controller 20 sends the print job to the information processing apparatus 16 (FIG. 1) in subsequent step S17.

Figure 10:
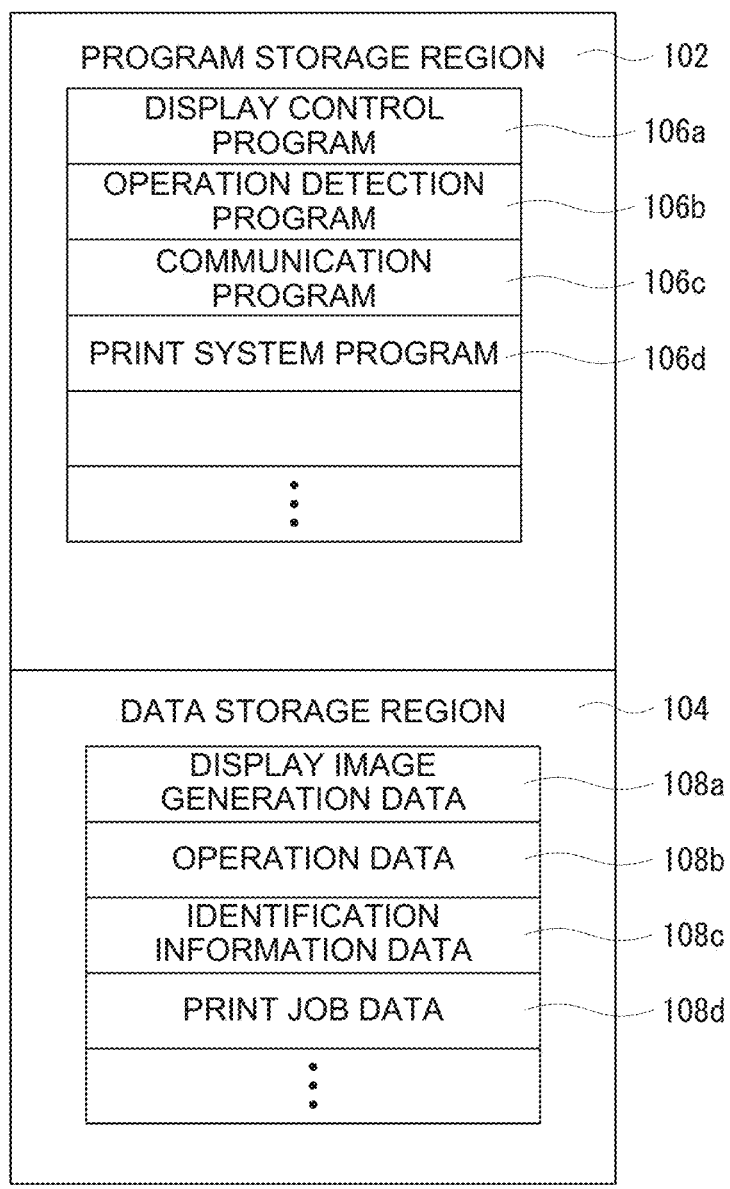
FIG. 10 is an illustrative view of an example of a memory map of a main storage of the information processing apparatus according to the embodiment illustrated in FIG. 1.

The main storage 76 of the information processing apparatus 16 that receives the print job includes a program storage region 102 and a data storage region 104 as illustrated in FIG. 10. The program storage region 102 stores control programs of the information processing apparatus (print server) 16.

The control programs of the information processing apparatus 16 include a display control program 106*a*, an operation detection program 106*b*, a communication program 106*c*, and a print system program 106*d*.

The display control program 106*a* is used to generate display screen data required for displaying various screens on a screen of the display 78 (FIG. 4) based on display image generation data 108*a* described below or the like, and causes the display section 70 to display an image on the display 78 using the display screen data.

The operation detection program 106*b* is used to detect operation data 108*b* (described below) corresponding to an operation performed on the operation acceptor 72 of the information processing apparatus 16.

The communication program 106*c* is used to control the communicator 66 and communicate through the network 18 (FIG. 1) to the user terminal 12, the image-forming apparatuses 14, and the like.

The print system program 106*d* that is an application program used when the user terminal 12 requests proxy printing to one of the image-forming apparatuses 14 in the example illustrated in FIG. 1 receives a print job from the user terminal 12, transmits a list (FIG. 9) of identification information of apparatus users registered in the individual image-forming apparatuses 14 in response to a request transmitted from the user terminal 12, and transmits the received print job to one of the image-forming apparatuses 14 having identification information included in the print job registered therein.

Although not illustrated, other programs and the like required for controlling the information processing apparatus 16 are also stored in the program storage region 102.

The data storage region 104 stores display image generation data 108*a*, operation data 108*b*, identification information data 108*c*, print job data 108*d*, and the like.

The display image generation data 108*a* includes polygon data, texture data, etc., for generating a display image. Furthermore, the display image generation data 108*a* includes image generation data corresponding to an image of a software key.

The operation data 108*b* is detected in accordance with the operation detection program 106*b* and is stored in time series.

The identification information data 108*c* corresponds to identification information of apparatus users who executed print jobs in the individual image-forming apparatuses 14 that is collected from print job log data 120*d* (FIG. 12) described below of the individual image-forming apparatuses 14, that is, identification information of apparatus users registered as users who may use the individual image-forming apparatuses 14. Note that, as described above, when the user terminal 12 registers identification information of a new apparatus user, the identification information is registered as the identification information data 108*c* when a notification of the registration of the identification information is received.

The print job data 108*d* is received from the user terminal 12 as described above in accordance with the print system program 106*d* and is transmitted to a corresponding one of the image-forming apparatuses 14 in accordance with the print system program 106*d*.

Note that, although not illustrated, the data storage region 104 not only stores other data required for execution of the control programs of the information processing apparatus 16 but also includes a flag and a counter (timer) required for executing the control programs.

Figure 11:
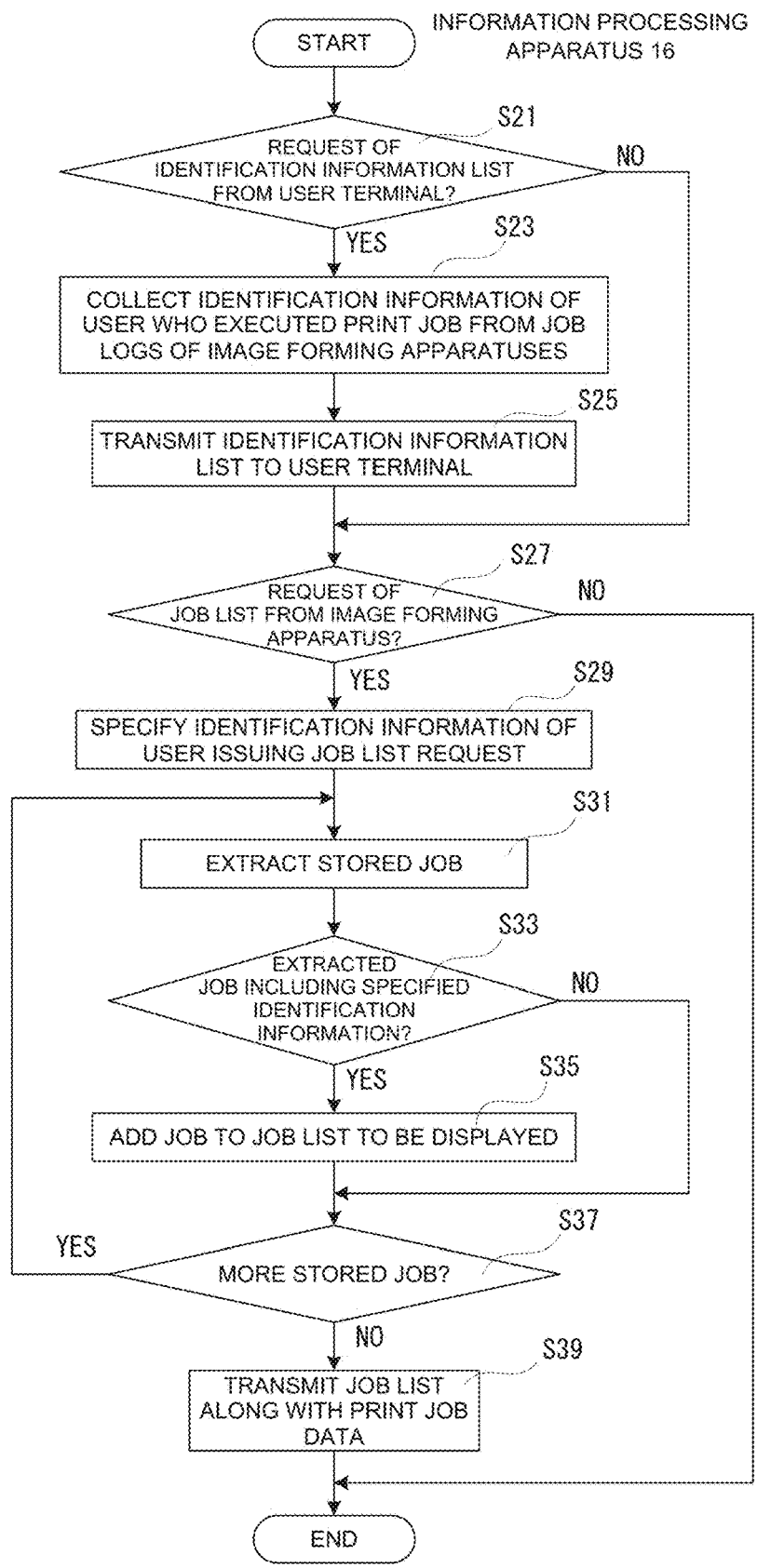
FIG. 11 is a flowchart of an example of an operation of a computer of the information processing apparatus according to the embodiment illustrated in FIG. 1.

FIG. 11 is a flowchart of an example of an operation of the information processing apparatus 16, and first, in step S21, the main controller 64 (FIG. 4) determines whether a request for transmission of the identification information list has been issued by the user terminal 12. When the determination is negative in step S21, the process proceeds to step S27.

When the determination is affirmative in step S21, the main controller 64 collects identification information of apparatus users who executed print jobs with reference to the print job logs of the image-forming apparatuses 14 in step S23. Then, in step S25, the main controller 64 uses the communicator 66 to transmit a list of the corrected identification information through the network 18 to the user terminal 12.

Then, in step S27, the main controller 64 determines whether a request for a print job list has been transmitted from one of the image-forming apparatuses 14 in accordance with the print system program 106*d*. When the determination is negative in step S27, the process is then terminated.

When the determination is affirmative in step S27, the main controller 64 extracts identification information of an apparatus user who requested the print job list from the request data in step S29. In other words, when requesting the print job list, the user adds own identification information to the request, and therefore, in step S29, the identification information is extracted to identify the apparatus user.

Subsequently, in step S31, print job data stored in the main storage 76 is extracted, and in step S33, the main controller 64 determines whether an extracted print job includes the identification information of the apparatus user who requested the print job list. Specifically, it is determined whether a print job associated with the apparatus user who requested the print job list is included.

When the determination is affirmative in step S33, the main controller 64 adds the print job determined in step S33 to the print job list to be displayed in step S35.

Figure 12:
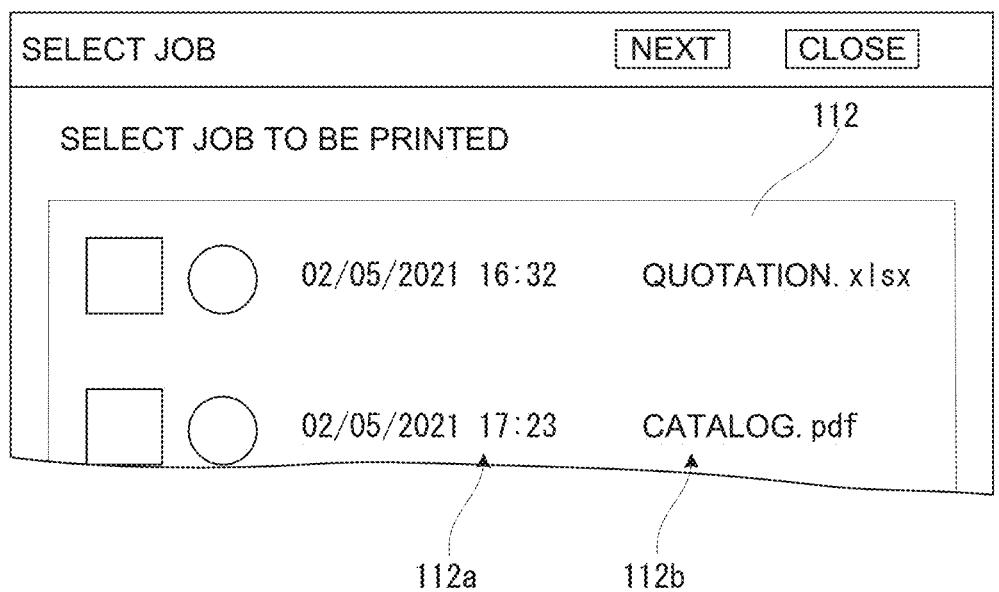
FIG. 12 is an illustrative view of an example of a print job list displayed by the image-forming apparatus according to the embodiment illustrated in FIG. 1.

Thereafter, the process in step S31 to step S37 is performed again, and when the determination is negative in step S37, the process proceeds to step S39 where the print job list illustrated in FIG. 12, for example, is transmitted to one of the image-forming apparatuses 14 in which the apparatus user who requested the transmission of the print job list to the information processing apparatus 16 is registered along with print job data indicated by the print job list. The print job list is displayed on the display 60 (FIG. 3) of the image-forming apparatus 14, and the print job data is stored as print job data 120*e* (described below).

The print job list display screen 110 shown in FIG. 12 is displayed by the display section 70 on the display 78 under control of the main controller 64 of the image-forming apparatus 14. Specifically, a list of print jobs (print job list) 112 including the identification information of the apparatus user who requested the print job list that are extracted from among the print job data in the main storage 76 is displayed.

In the example in FIG. 12, the print job list 112 includes a transmission date and time 112*a* when a print job is transmitted from the user terminal 12 to the information processing apparatus 16 (in an example in an upper portion, Feb. 5, 2021 16:32) and a file name 112*b* including an extension (in the example in the upper portion, "quotation"). However, the print job list does not include identification information of a user included in the example of FIG. 6. This is because the print job list 112 is not transmitted to any other image-forming apparatus 14 than the image-forming apparatus 14 in which an apparatus user having identification information that is identical with the identification information of the apparatus user specified by the user terminal 12 is registered.

Figure 13:
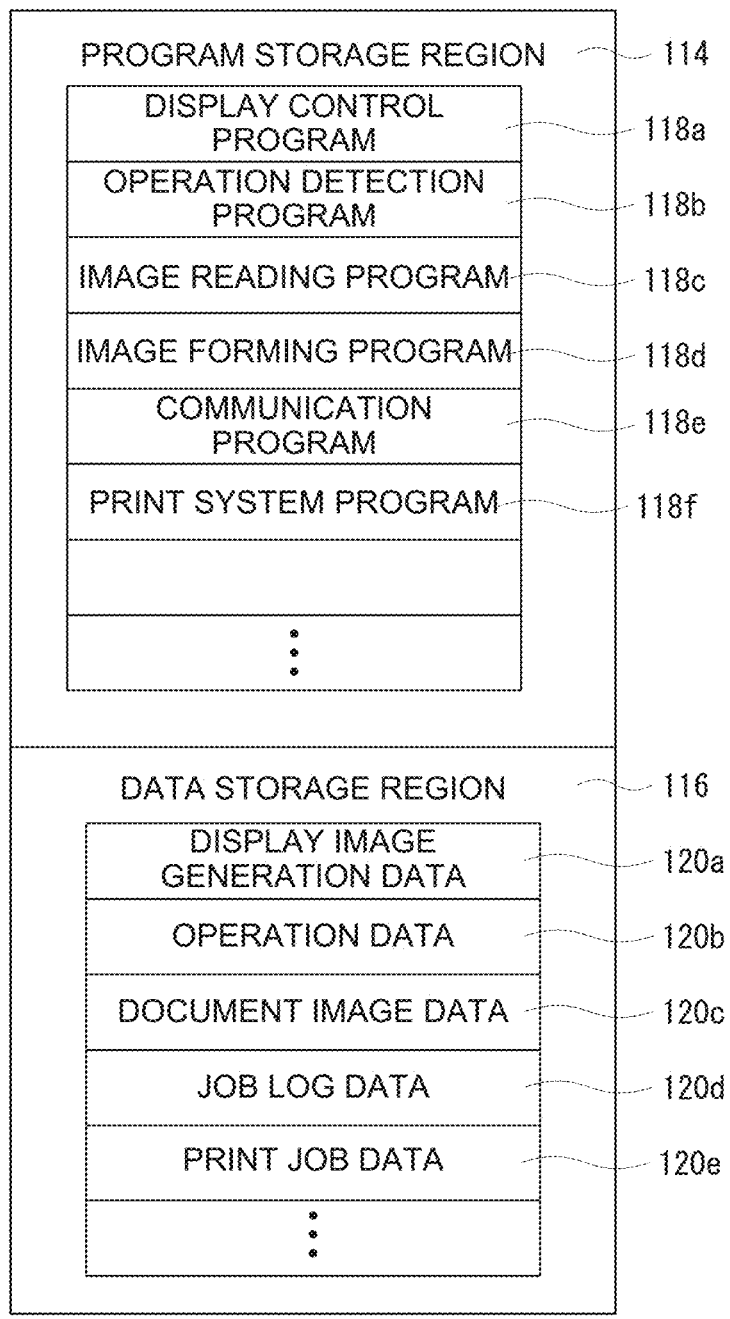
FIG. 13 is an illustrative view of an example of a memory map of a main storage of the image-forming apparatus according to the embodiment illustrated in FIG. 1.

FIG. 13 is an illustrative view of an example of a memory map of the main storage 58 of each of the image-forming apparatuses 14 according to the embodiment illustrated in FIG. 1. As illustrated in FIG. 13, the main storage 58 includes a program storage region 114 and a data storage region 116. The program storage region 114 stores control programs of the image-forming apparatus 14.

The control programs of the image-forming apparatus 14 include a display control program 118*a*, an operation detection program 118*b*, an image reading program 118*c*, an image-forming program 118*d*, a communication program 118*e*, and a print system program 118*f*.

The display control program 118*a* is used to generate display screen data required for displaying various screens on a screen of the display 60 (FIG. 3) based on display image generation data 120*a* described below or the like, and causes the display section 52 to display an image on the display 60 using the display screen data.

The operation detection program 118*b* is for detecting operation detection data corresponding to operations performed on operation acceptors of the image-forming apparatus 14. For example, when the touch panel 62 is touched, the main controller 46 obtains touch coordinate data output from the touch panel 62 as the operation data 120*b* described below in accordance with the operation detection program 118*b* and stores the operation data 120*b* in the data storage region 116 of the main storage 58. Furthermore, when a hardware button or a key (not illustrated) included in the image-forming apparatus 14 is pressed or operated, the main controller 46 obtains the operation data 120*b* of pressing or operating of the button or the key in accordance with the operation detection program 118*b* and stores the operation data 120*b* in the data storage region 116 of the main storage 58.

The image reading program 118*c* controls the image reader 36 (FIG. 3) to read a document on a document table (not shown).

The image-forming program 118*d* is, for example, used to print a document image based on the document image generated by the image reader 36.

The communication program 118*e* is used to control the communicator 42 so as to communicate with an external computer and a facsimile apparatus through the network 18 (FIG. 1).

The print system program 118*f* is used in the print system 10 in the embodiment shown in FIG. 1 to perform proxy printing of a print job generated by the user terminal 12 in response to an instruction (request) issued by the terminal user of the user terminal 12. It is assumed that transmission of a print job list for specifying an apparatus user of the image-forming apparatus 14 is requested to the information processing apparatus (print server) 16 or a print job selected in the print job list is executed.

Although not illustrated, the program storage region 114 also stores other programs required for controlling the image-forming apparatus 14.

The data storage region 116 stores display image generation data 120*a*, operation data 120*b*, document image data 120*c*, job log data 120*d*, print job data 120*e*, and the like.

The display image generation data 120*a* includes polygon data, texture data, etc., for generating a display image. Furthermore, the display image generation data 120*a* includes image generation data or the like for displaying an image corresponding to a software key and the print job list 110 (FIG. 12).

The operation data 120*b* is detected in accordance with the operation detection program 118*b* and is stored in time series.

The document image data 120*c* is image data of a document read by the image reader 36 (FIG. 3).

The job log data 120*d* is a log data that records apparatus users who have logged into this image-forming apparatus 14 and executed print jobs. The terminal user of the user terminal 12 basically specifies an apparatus user recorded in the job log data 120d so as to request proxy printing.

The print job data 120e is requested to be transmitted to the information processing apparatus 16 by the apparatus user.

Note that, although not illustrated, the data storage region 116 not only stores other data required for execution of the control programs of the image-forming apparatus 14 but also includes a flag and a counter (timer) required for executing the control programs.

Referring to FIG. 14, the main controller 46 of the image-forming apparatus 14 first determines, in step S51, whether the apparatus user has logged in. Once logged in, the determination is affirmative in step S51, and subsequently, in step S53, the main controller 46 requests the information processing apparatus 16 to send a print job list.

When the print job list (and corresponding print job data) is received from the information processing apparatus 16 in step S55, the print job list screen 110 shown in FIG. 12 is displayed on the display 60 and the print job data is stored in the data storage region 116 of the main storage 58 as the print job data 120e in step S57.

Then, in step S59, the main controller 46 determines whether the apparatus user has selected a print job in the displayed print job list. For example, when a touch operation of the touch panel 62 of the operation acceptor 54 is performed and a touch position indicates one of print jobs shown in FIG. 12, it is determined that the print job has been selected and the determination is affirmative in step S59.

In step S61, data of the print job determined to have been selected in step S59 is read from the print job data 120c and the print job is executed in accordance with the print job data.

The process is terminated when there are no more print jobs in step S63.

Note that the registered user of the image-forming apparatus 14 may recognize that proxy printing has been requested by the terminal user of the user terminal 12, when the terminal user makes a phone call or transmits an e-mail with a message "I've registered a print job, please take care of it!" or the like. In other words, the apparatus user may recognize a request of proxy printing by a contact from the terminal user.

In the above embodiment, when a query is received from one of the image-forming apparatuses 14 (step S27 and step S53), the information processing apparatus 16 sends a job list and data of print jobs included in the job list to the image-forming apparatus 14 in step S39. However, the information processing apparatus 16 may transmit only the job list to the image-forming apparatus 14 but keep the print job data therein, and the print job data may be transmitted to the image-forming apparatus 14 each time the image-forming apparatus 14 issues a request. Since the information processing apparatus 16 is considered to be more secure than the image-forming apparatus 14, a print job may be more securely protected when the print job is transmitted to the image-forming apparatus 14 each time the print job is requested by the image-forming apparatus 14.

What is claimed is:

1. A print system in which a print job generated by a user terminal is executed by an image-forming apparatus through an information processing apparatus, wherein
one or more processors of the user terminal execute instructions stored in a memory of the user terminal to
transmit a print job including identification information specifying an apparatus user of the image-forming apparatus to the information processing apparatus,
one or more processors of the information processing apparatus execute instructions stored in a memory of the information processing apparatus to
store the print job transmitted from the user terminal in the memory of the information processing apparatus, and
transmit a job list of print jobs including the print job and identification information to the image-forming apparatus when the image-forming apparatus issues a request,
one or more processors of the image-forming apparatus execute instructions stored in a memory of the image-forming apparatus to
receive the print job included in the job list from the information processing apparatus, and
execute the received print job and
the one or more processors of the user terminal further execute the instructions to
determine whether the apparatus user having the identification information included in the print job is registered in a target image-forming apparatus, and
cancel the print job by deleting registered print job data when determining that the apparatus user is not registered in the target image-forming apparatus.

2. The print system according to the claim 1, wherein
the one or more processors of the user terminal further execute the instructions to
determine whether a print button that is set on the user terminal is operated by the apparatus user,
obtain an identification information list from the information processing apparatus when determining that the print button is operated by the apparatus user, and
determine whether the identification information included in the print job is included in the identification information list to determine whether the apparatus user having the identification information included in the print job is registered in the target image-forming apparatus.

3. The print system according to the claim 2, wherein
the one or more processors of the user terminal further execute the instructions to
determine, when the identification information included in the print job is not included in the identification information list, that a new apparatus user is to be registered, and
transmit identification information of the new apparatus user to the information processing apparatus when the new apparatus user is determined to be registered such that the identification information is registrable in the information processing apparatus.

4. The print system according to the claim 1, wherein
the one or more processors of the information processing apparatus further execute the instructions to
collect identification information of apparatus users which have executed print jobs with reference to print job logs of a plurality of the image-forming apparatuses including the image-forming apparatus, and
transmit to the user terminal a list of collected identification information.

5. A print method in a print system in which a print job generated by a user terminal is executed by an image-forming apparatus through an information processing apparatus, the method comprising:

transmitting, by the user terminal, a print job including identification information specifying an apparatus user of the image-forming apparatus to the information processing apparatus;
storing, by the information processing apparatus, the print job transmitted from the user terminal;
requesting, by the image-forming apparatus, the information processing apparatus to transmit a job list of print jobs including the print job and identification information;
receiving, by the image-forming apparatus, the print job included in the job list from the information processing apparatus;
executing, by the image-forming apparatus, the received print job;
determining, by the user terminal, whether the apparatus user having the identification information included in the print job is registered in a target image-forming apparatus; and
cancelling, by the user terminal, the print job by deleting registered print job data when determining that the apparatus user is not registered in the target image-forming apparatus.

\* \* \* \* \*